United States Patent
Yan et al.

(10) Patent No.: US 10,444,465 B2
(45) Date of Patent: Oct. 15, 2019

(54) LENS DRIVING DEVICE

(71) Applicant: AAC Technologies Pte, Ltd., Singapore (SG)

(72) Inventors: Xudong Yan, Shenzhen (CN); Jing Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 15/884,453

(22) Filed: Jan. 31, 2018

(65) Prior Publication Data
US 2018/0149825 A1    May 31, 2018

Related U.S. Application Data

(63) Continuation of application No. 15/256,908, filed on Sep. 6, 2016, now Pat. No. 9,915,800.

(51) Int. Cl.
*G02B 7/02* (2006.01)
*G11B 7/09* (2006.01)
*G02B 7/08* (2006.01)

(52) U.S. Cl.
CPC ............... *G02B 7/023* (2013.01); *G02B 7/08* (2013.01); *G11B 7/0908* (2013.01); *G11B 7/0927* (2013.01)

(58) Field of Classification Search
CPC ... G11B 7/0908; G11B 7/0925; G11B 7/0927; G11B 7/0929; G11B 7/093; G11B 7/0937; H02K 41/0356
USPC .................................................. 359/822–826
See application file for complete search history.

(56) References Cited

U.S. PATENT DOCUMENTS

| | | | | |
|---|---|---|---|---|
| 4,482,986 A | * | 11/1984 | Noda | G11B 7/0932 359/824 |
| 2011/0051264 A1 | * | 3/2011 | Kim | G02B 7/023 359/822 |

* cited by examiner

*Primary Examiner* — William Choi
(74) *Attorney, Agent, or Firm* — IPro, PLLC; Na Xu

(57) ABSTRACT

A lens driving device includes a housing with an accommodation space, a barrel accommodated in the housing, a coil wound around the barrel and a magnet fixed to the housing. The lens driving device further includes a spring piece at least partially made of amorphous alloy materials, and the spring piece support the described barrel to perform the to-and-fro motion along the axis. Comparing to the relevant technologies, the lens driving device has good performance and high reliability.

6 Claims, 2 Drawing Sheets

LENS DRIVING DEVICE

FIELD OF THE INVENTION

The present invention relates to a lens driving device, and more particularly to a lens driving device used in a portable consumer device.

DESCRIPTION OF RELATED ART

With the diversification of the functions from the digital products, the digital equipment with cameras or video cameras, e.g. mobile phone and multimedia player etc., have been developed rapidly and applied extensively.

Usually, above mentioned camera or video camera uses the lens with adjustable focusing or automatic focusing, however, the adjusting process is to change the lens' position, and a motor is usually used for driving the lens to move, and the motor adjusts the lens' position by bracket, while the coil in the motor gets power on or off, acted by the magnetic field, the coil will move, and then drive the barrel, i.e. drive the lens to move.

More and more users demand miniaturized digital products, which means that the components in the digital products should also be miniaturized with this trend. The lens driving device with the relevant technologies comprises an housing, a barrel, a plurality of spring pieces and a plurality of coils accommodated in the housing, and the method of connecting the coil and an external power supply is that the spring piece is connected to the external power supply, and there is also an electric connection between the coil and the spring piece. Nevertheless, after power on, the coil will generate a magnetic field that will drive the spring piece to stretch in radial manner, because the spring piece is very thin, with poor intensity, and it is hard to weld its material, the spring piece is easy to get broken or the connection between the coil and the spring piece is easy to get bad, thereby causing poorly reliable performance of the lens driving device.

Therefore, it is necessary to provide an improved lens driving device to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
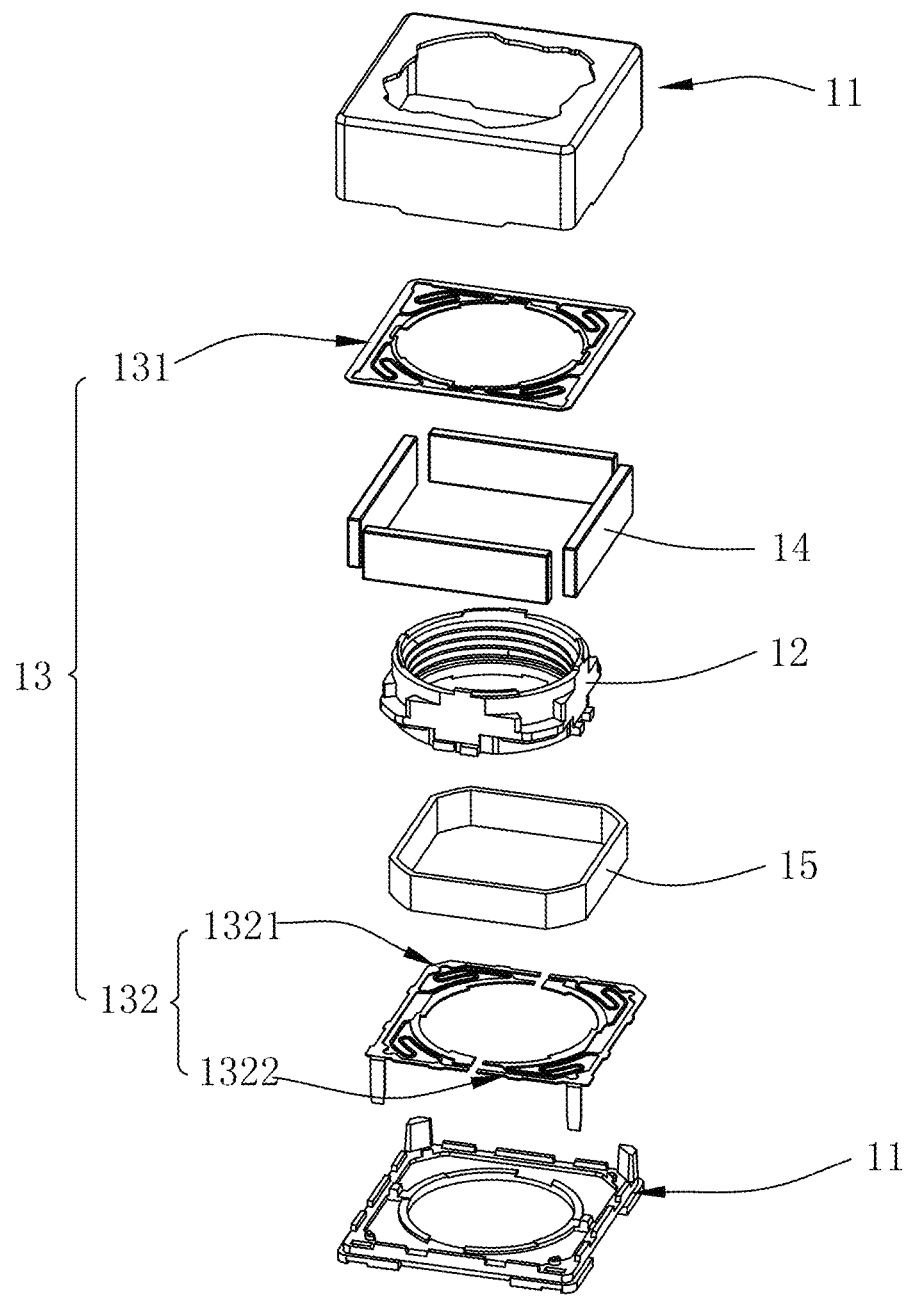
FIG. 1 is an isometric and exploded view of a lens driving device in accordance with an exemplary embodiment of the present disclosure.

Please refer to FIG. 1, a lens driving device 10 in accordance with an exemplary embodiment of the present disclosure, comprises a housing 11, a barrel 12, a spring piece 13, a magnet 14 and a coil 15. The barrel 12 is accommodated in the housing 11, and the spring piece 13 supports the barrel 12 in the housing 11, and the magnet 14 and coil 15 are fixed to the housing 11 and the barrel 12 respectively, in this embodiment, the magnet 14 is fixed onto the housing 11, and the coil 15 winds the barrel 12. The coil 15 and the spring piece 13 are connected electrically with each other for forming a circuit, while the coil gets power on/off, it is affected by the magnet field generated by the magnet 14, and the coil 15 moves under the action of Lorentz force and then drives the barrel 12 to move. In order to add the motion stroke of the barrel 12, at least part of the spring piece of the lens driving device 10 should be made of amorphous alloy material, in order to strengthen the spring intensity of the spring piece 13.

In this embodiment, the amorphous alloy material is Zr—Al—Ni—Cu—Y or Zr—Al—Ni—Cu—Be, of course, other amorphous alloy material is also feasible, and its purpose is to strengthen the spring intensity and weldability of the spring piece 13.

The spring piece 13 can be molded in many methods, e.g. forming an amorphous coating or forming the physical deposition layer in the method of physical vapor deposition. Specifically, this embodiment chooses one of spring pieces randomly molded by the physical vapor depositions, including the magnetron sputtering, plasma sputtering or vapor deposition. Of course, it can be also a spring piece molded in other method, as long as part of the spring piece is made of amorphous alloy material that strengthens spring intensity of the spring piece, it is viable.

Figure 2:
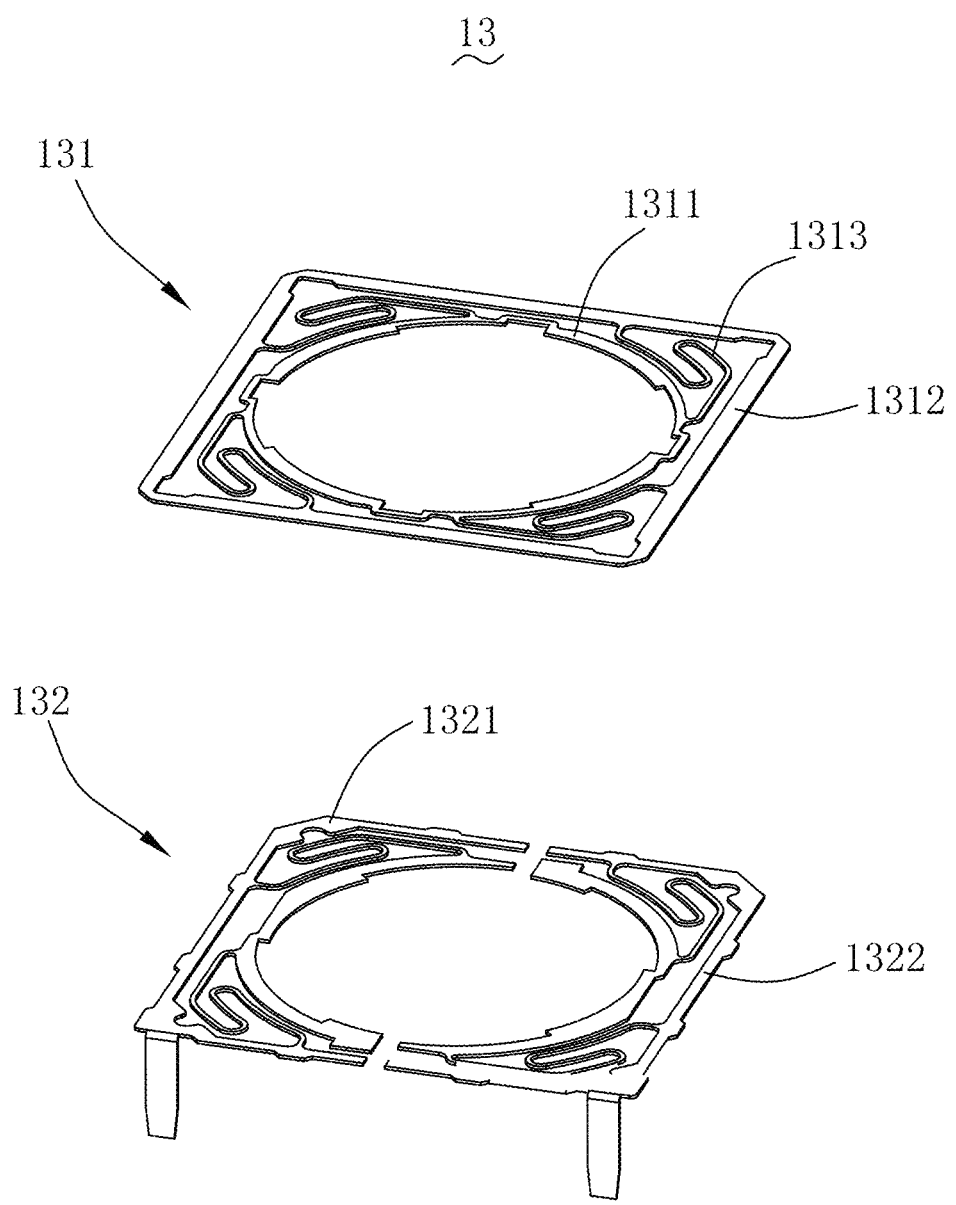
FIG. 2 is an isometric view of a spring piece of the lens driving device in FIG. 1.

Please refer to FIG. 2, the spring piece 13 includes an upper spring piece 131 and a lower spring piece 132. The upper spring 131 fixes and supports the upper end of the barrel 12 to the barrel 12, and the lower spring piece 132 fixes and supports the lower end of the barrel 12 to the barrel 12. The upper spring piece 131 and the lower spring piece 132 coordinate together to provide the support force and restoring force for the barrel 12, and force the barrel 12 to perform to-and-fro motion along the optical axis.

In the lens driving device 10, the upper spring piece 131 or the lower spring piece 132 can be designed as the spring pieces processed and molded with amorphous alloy materials. Or the upper spring piece 131 and the lower spring piece 132 can both be designed as the spring pieces processed and molded with amorphous alloy materials. The design can be chosen according to the requirement of performance from the driving device 10. In this embodiment, the upper spring piece 131 and the lower spring piece 132 are both designed as the spring pieces processed and molded with amorphous alloy materials.

The spring piece 131 includes an internal fixing arm 1311, an external fixing arm 1312 and a plurality of spring arms 1313. The internal fixing arm 1311 is fixed to the upper end of the barrel 12, and the external fixing arm 1312 is fixed to the housing 11. Every spring arm 1313 is both connected to the internal fixing arm 1311 and the external fixing arm 1312. Specifically, four spring arms 1313 are provided between the internal fixing arm 1311 and external fixing arm 1312. The spring arm 1313 is wavy, and this structure design further strengthens the spring force of the upper spring piece 131. Since the upper spring piece 131 is processed and molded by amorphous alloy material, it further strengthens the spring intensity of the upper spring piece 131, in order to strengthen the performance of the lens driving device 10. While a picture taking lens (not shown in the figure) is installed in the lens driving device 10, the focal length adjustment scope of the lens can be improved, and its optical performance can be improved too.

The lower spring piece 132 includes a first lower spring piece 1321 and a second lower spring piece 1322. The first lower spring piece 1321 and second lower spring piece 1322 are located coplanar with each other and are insulated from each other. Two sides of the coil 15 are fixed to the first lower spring piece 1321 and the second lower spring piece 1322 respectively, i.e. the anode and cathode o3ocessed and molded by amorphous alloy material, it strengthens its spring intensity and welding performance, i.e. while the coil 15 is welded onto the lower spring piece 132, the welding performance is more stable, and it avoids bad connection of the coil 15 due to excessive vibration amplitude of the lower spring piece 132.

Of course, only part of the upper spring piece 131 and lower spring piece 132 can be made of amorphous alloy material, e.g. only the spring arm 1313 of the upper spring piece 131 and the lower spring piece 132 are made of amorphous alloy material.

Comparing with relevant technologies, the spring piece 13 of the lens driving device 10 of this utility model is made of amorphous alloy material which improves its spring intensity and welding performance significantly, and avoids bad welding connection of the coil 15 or the broken spring piece 13 due to excessive vibration amplitude, and improves the reliability performance of the lens driving device 10, without changing the thickness of the spring piece 13.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens driving device, comprising:
   a housing with an accommodation space;
   a barrel accommodated in the housing;
   a coil wound around the barrel;
   a magnet fixed to the housing; and
   a spring piece made of amorphous alloy materials for supporting the barrel in the housing; wherein the spring includes an upper spring piece and a lower spring piece made of amorphous material, and the upper spring piece fixes and supports the upper end of the barrel in the barrel, and the lower spring piece fixes and supports the lower end of the barrel in the barrel;
   wherein the lower spring piece includes a first lower spring piece and a second lower spring piece;
   the first lower spring piece and the second lower spring piece are located coplanar with each other and insulated from each other.

2. The lens driving device as described in claim 1, wherein the amorphous alloy material is Zr—Al—Ni—Cu—Y or Zr—Al—Ni—Cu—Be.

3. The lens driving device as described in claim 1, wherein the amorphous alloy material is an amorphous coating layer or a physical vapor deposition layer.

4. The lens driving device as described in claim 1, wherein the upper spring piece includes an internal fixing arm fixing to the upper end of the barrel, an external fixing arm fixed to the housing, and a plurality of spring arms connecting the internal fixing arm to the external fixing arm.

5. The lens driving device as described in claim 4, wherein the spring arm has a wavy shape.

6. The lens driving device as described in claim 1, wherein the lower spring piece is made of amorphous alloy material.

* * * * *